G. N. CHENAULT.
COTTON CHOPPER.
APPLICATION FILED JUNE 22, 1912.
1,053,276.
Patented Feb. 18, 1913.
2 SHEETS—SHEET 1.
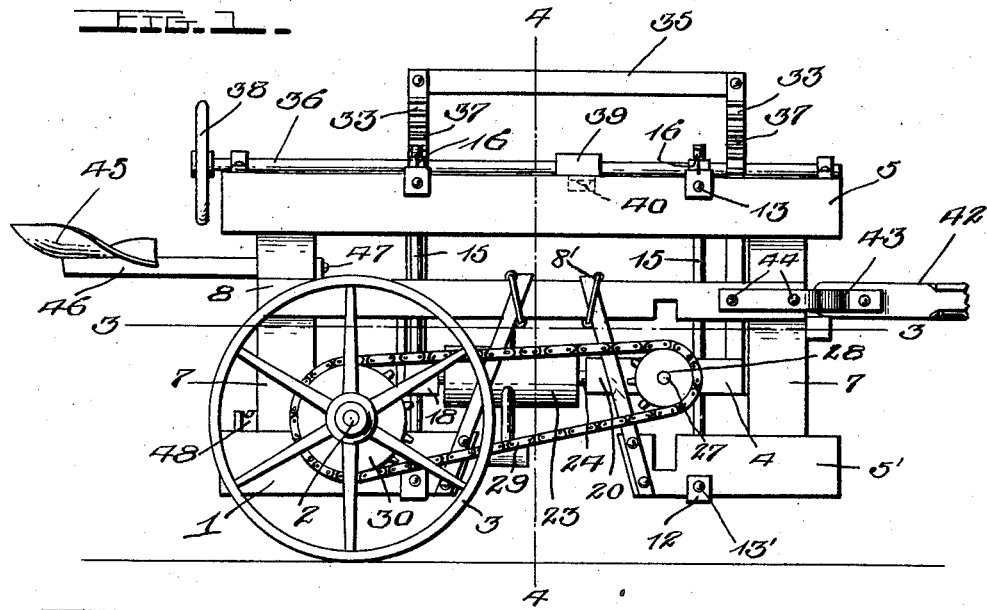
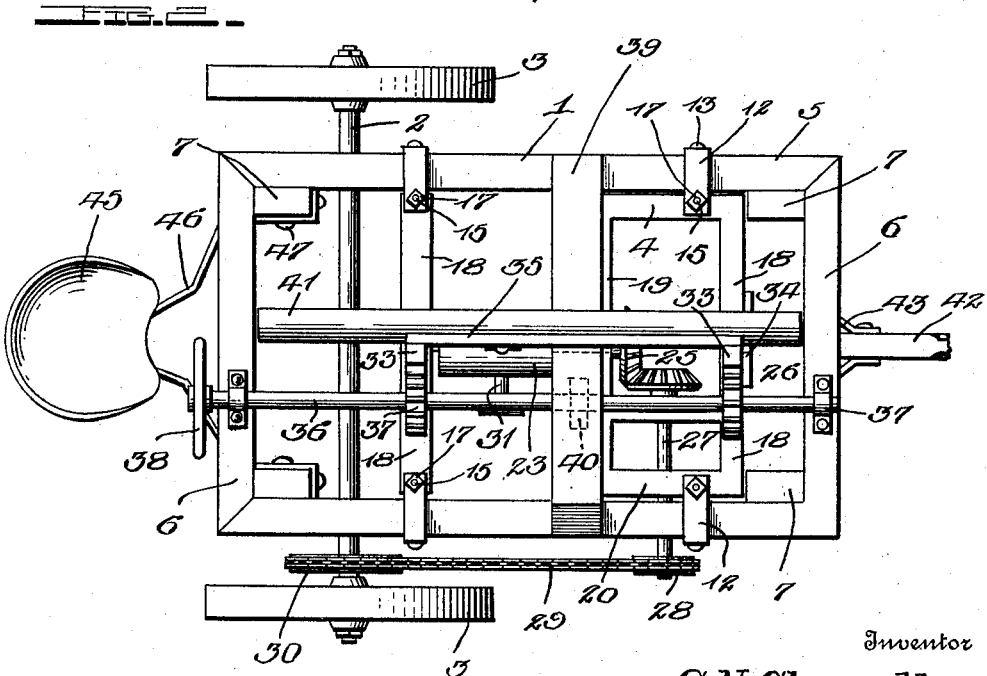
Witnesses
Chas. L. Griesbauer.
A. B. Norton.
Inventor
G. N. Chenault,
By Watson E. Coleman
Attorney

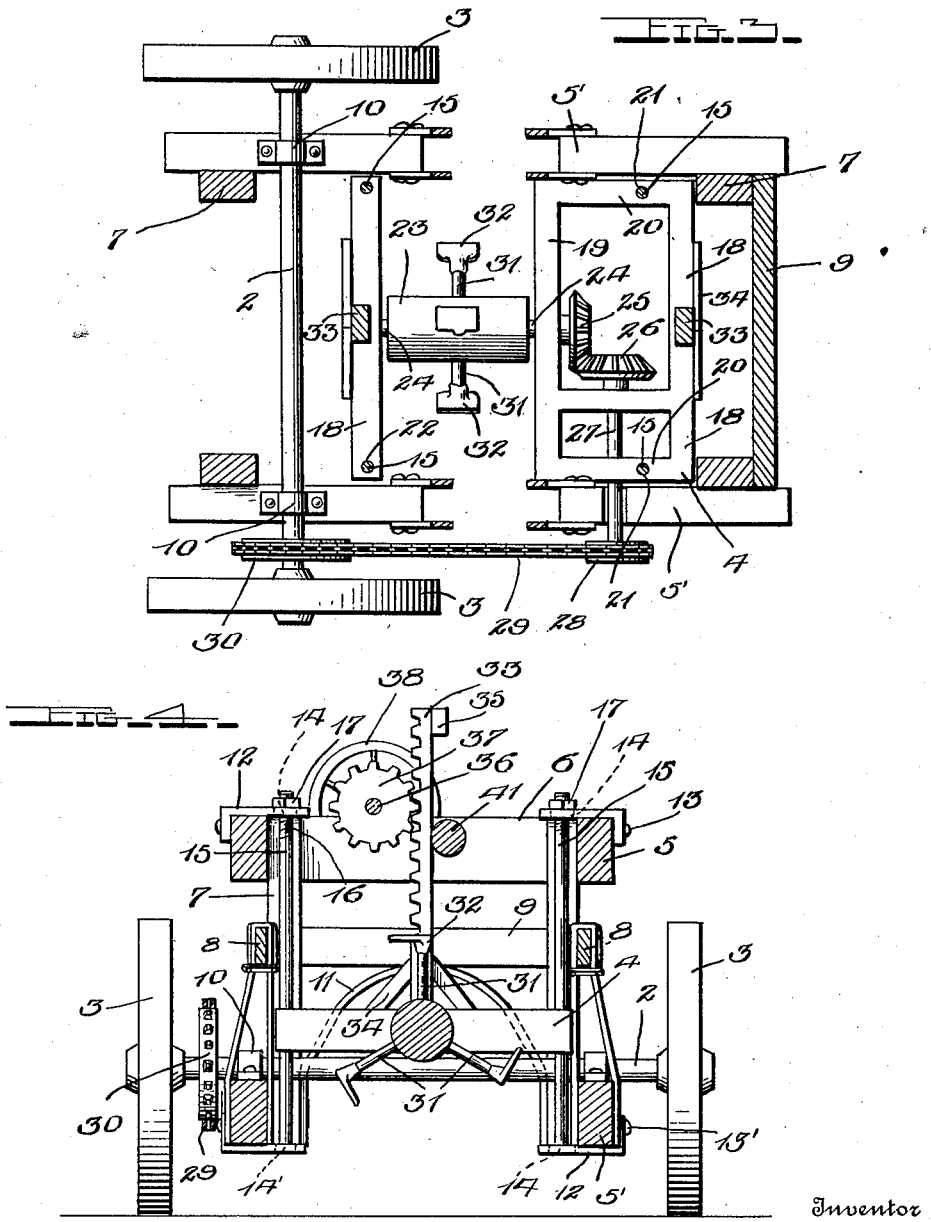

UNITED STATES PATENT OFFICE.

GEORGE N. CHENAULT, OF FORNEY, TEXAS.

COTTON-CHOPPER.

1,053,276.  Specification of Letters Patent.  Patented Feb. 18, 1913.

Application filed June 22, 1912. Serial No. 705,299.

*To all whom it may concern:*

Be it known that I, GEORGE N. CHENAULT, a citizen of the United States, residing at Forney, in the county of Kaufman and State of Texas, have invented certain new and useful Improvements in Cotton-Choppers, of which the following is a specification, reference being had to the accompanying drawings.

This invention relates to new and useful improvements in cotton choppers, the object of the invention being to provide a device of this character which will chop out the plants in the field in either hills or drills, at regular or determined distances, in the direction of the row, so as to afford room for the growth of the remaining plants.

Another object of the invention is to provide a simple, efficient, and comparatively inexpensive machine equipped with adjustable cotton chopping mechanism and with means for raising or lowering the cotton chopping mechanism.

A further object of the invention is to provide a cotton chopper comprising a stationary supporting frame which is mounted for transportation upon a wheel supported axis and which in turn carries a vertical adjustable frame which supports the rotary chopping knives.

A still further object of the invention is to provide a cotton chopper of the above character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claims, and shown in the accompanying drawings, in which, Figure 1 is a side elevation. Fig. 2 is a top plan view. Fig. 3 is a horizontal sectional view and Fig. 4 is a transverse sectional view.

In carrying out my invention, I provide a stationary frame 1 which is supported at the rear end thereof by means of the axle 2 upon the outer ends of which are mounted the wheels 3. Mounted for vertical adjustment within the frame 1 is the movable frame 4. The frame 1 comprises the upper and lower longitudinal bars 5 and 5', said upper longitudinal bars being connected at each end by means of the transverse cross pieces 6, and the lower longitudinal bars 5' are secured at each end of the vertical upright pieces 7 which are in turn secured at their upper ends to the ends of the bars 5 and 6. The vertical pieces 7 are further supported by means of the longitudinal side bars 8 and the intermediate transverse end bars 9. The longitudinal bars 5' are cut away at their intermediate portions and the ends thereof are supported by means of the brace members 7', the upper ends of which are secured to the longitudinal side bars 8 by means of the cuffs or U shaped bolts 8'. The axle 2 is mounted in the bearings 10 which are secured to the inner side of the bars 5' adjacent the front end thereof and extend upwardly therefrom. The upright pieces 7 and the intermediate cross bars 9 are suitably braced at each end of the frame by means of the arcuate brace members 11 having their ends secured to the upright pieces 7 at the lower ends thereof, the intermediate portions of said brace members being arranged beneath the bars 9 and secured thereto in any suitable manner.

Secured to the upper longitudinal bars 5 and the lower longitudinal bars 5' and arranged upon the outer side thereof are the angular brackets 12, the brackets secured to the upper bars 5 having their vertical portions bolted to the bars by means of the bolts 13 and their horizontal portions extending inwardly from the top of the bar and provided with the openings 14. The vertical portions of the brackets which are secured to the bars 5' are bolted to the bars by means of the bolts 13', the horizontal portions of said brackets extending inwardly beneath the bars, the inner end of said horizontal portions being provided with the openings 14' which are adapted to be arranged in alinement with the openings 14 formed in the horizontal portions of the brackets which are secured to the upper bars 5.

Vertically disposed guide rods 15 are provided, having their lower ends arranged in the openings 14', and their upper ends arranged in the openings 14, the upper ends of said rods being threaded as shown at 16 and having the nuts 17 threaded thereon to hold said guide rods securely in position. Vertically movable upon the rods 15 is the frame 4 which comprises the transverse end pieces 18, a transverse intermediate bar 19 which is arranged in spaced relation with one of the end pieces and suitably connected therewith by means of the longitudinal pieces 20. One of the end pieces 18 is provided at each end with a guide receiving opening 21 adapted to receive the vertically disposed guide rods 15. The longitudinal pieces 20 which are arranged at each end of the bar 19 and the second end pieces 18 are provided with guide receiving openings 22 so that the frame 4 may be vertically adjusted with respect to the frame 1.

A drum 23 is rotatably mounted upon the shaft 24, the ends of which are arranged in bearings formed in one of the end pieces 21 and the intermediate transverse portion 19. The end of the shaft which is mounted in the intermediate bar 19 extends therethrough and upon the outer end thereof is mounted a gear 25 which is adapted to mesh with a similar gear 26 which is mounted upon the inner end of the shaft 27, having its bearings in the longitudinal pieces 20 and upon the outer end of which is mounted a sprocket 28, which in turn is connected, by means of the chain 29 to a similar sprocket 30 mounted upon the axle 2 and arranged between the frame 1 and one of the wheels.

Arranged within the drum 23 are a plurality of radially projecting arms 31, upon the outer ends of which are mounted the cutting blades 32. Mounted upon the cross pieces 21 at a central point are the upwardly extending racks 33 which are suitably braced at their lower ends by means of the brace members 34 and are connected at their upper ends by means of the transverse cross piece 35. It will be apparent that the cutaway portions of the longitudinal bars 5' will allow the weeds and other plants to pass out of the frame and prevent them from being clogged between the frame and the knives. A longitudinal shaft 36 is journaled upon the upper side of the bars 6 upon which is mounted the gears 37 which are adapted to mesh with the racks 33 to raise and lower the frame 4. Mounted upon the rear end of the shaft 36 is a hand wheel 38 whereby the shaft 36 may be rotated to raise or lower the frame 4. A transverse cross member 39 is mounted upon the top of the frame 1 and is provided with a bearing 40 in which the intermediate portion of the shaft 36 is journaled. Arranged in parallel relation with the shaft 36 and having its end mounted in the cross bars 6 is a roller 41 which bears against the rear sides of the racks 33 to hold the same into engagement with the gear wheels 37.

The tongue 42, by means of which the device is transported from place to place, is secured at its inner end between the forwardly extending arms 43, the rear ends of which are arranged in parallel relation with the side pieces 8 and secured thereto by means of the bolts 44. The driver's seat 45 is mounted upon the rear ends of the arms 46, the inner ends of which are secured to the frame by means of the bolts 47. Foot rests 48 are mounted upon the rear ends of the bars 5.

From the above description, it will be readily seen that by the rotation of the wheel 38, the frame 4 may be raised or lowered according to the character of the surface over which the machine passes. It will also be understood that the chain 29 is to be of sufficient length to allow the frame 4 to be adjusted to any desired height.

While I have shown and described the preferred form of my invention, it will be obvious that various changes in the details of construction and in the proportions may be resorted to for successfully carrying my invention into practice without sacrificing any of the novel features or departing from the scope thereof.

What I claim is:—

1. The combination of a traction axle, a stationary frame supported at one end by said axle, said frame comprising vertical uprights, upper and lower longitudinal bars and intermediate bars having their ends connected to said uprights, said lower bars being cut away at their intermediate portions, brace members having their lower ends secured to the inner ends of the bars and U-bolts securing the upper ends of said brace members to said intermediate bar.

2. The combination of a traction axle, a stationary frame supported at one end by said axle, a second frame arranged within the stationary frame and movable vertically with respect thereto, said second frame comprising transverse pieces, means for connecting said transverse pieces, vertically disposed racks having their lower ends mounted upon said transverse pieces, a cross bar connecting the upper ends of said racks, a longitudinal shaft mounted upon the stationary frame and arranged in front of said racks, gears mounted upon said shaft and meshing with said racks, a hand wheel upon the rear end of the shaft to rotate the same and raise or lower the second frame, a longitudinal roller having its ends mounted in the stationary frame and bearing against the rear side of said racks to hold the same into engagement with the gears, chopping mechanism carried by the second frame and means connecting the traction axle with the chopping mechanism to manipulate the same upon the rotation of the axle.

In testimony whereof I hereunto affix my signature in the presence of two witnesses.

GEORGE N. CHENAULT.

Witnesses:
FRANK M. ADAMS, Jr.,
FLOYD P. CHENAULT.